Figure 1:
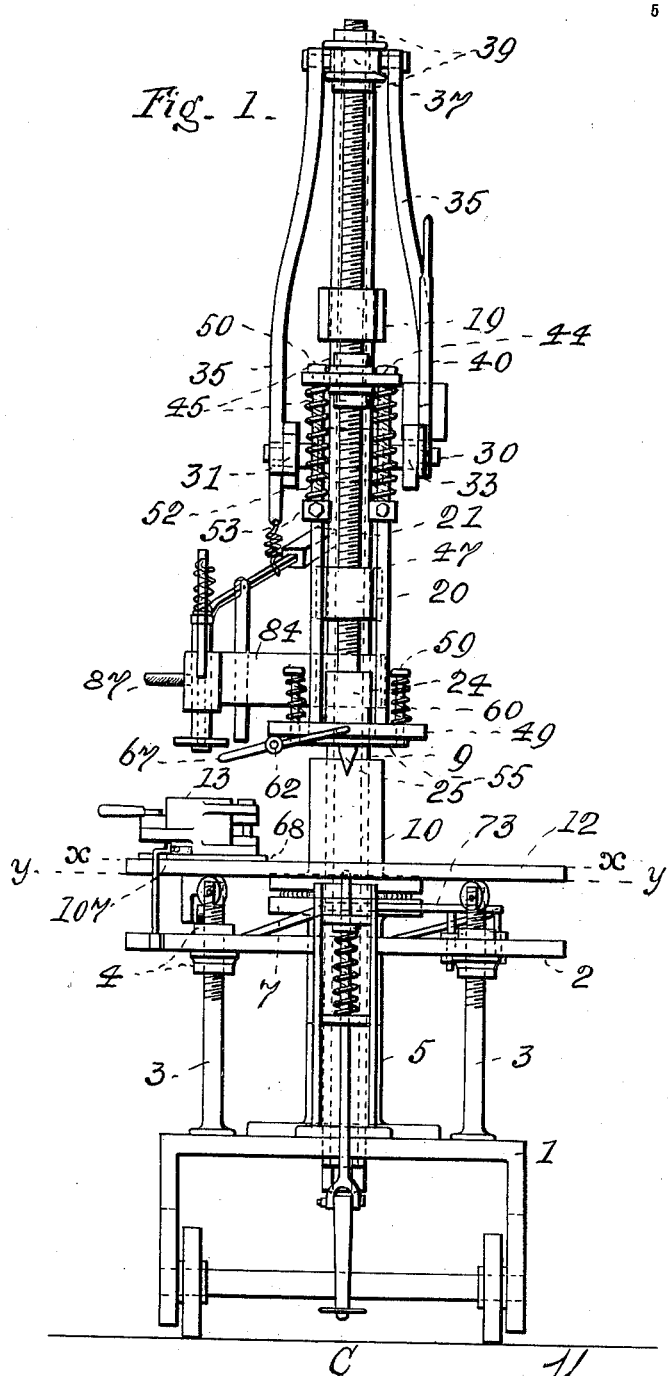

No. 736,708. PATENTED AUG. 18, 1903.
T. C. DUFFIELD.
MACHINE FOR PRODUCING GLASS BOTTLES.
APPLICATION FILED MAR. 26, 1903.
NO MODEL. 5 SHEETS—SHEET 1.

Witnesses
C. H. Walker
Geo. J. Brennan

Inventor
Thomas C. Duffield,
by W. T. Howard
Attorneys

No. 736,708. PATENTED AUG. 18, 1903.
T. C. DUFFIELD.
MACHINE FOR PRODUCING GLASS BOTTLES.
APPLICATION FILED MAR. 26, 1903.
NO MODEL. 5 SHEETS—SHEET 2.

Fig. 2.

Witnesses
C. H. Walker
Geo. J. Brennan

Inventor
Thomas C. Duffield
by Geo. W. T. Howard
Attorneys

No. 736,708. PATENTED AUG. 18, 1903.
T. C. DUFFIELD.
MACHINE FOR PRODUCING GLASS BOTTLES.
APPLICATION FILED MAR. 26, 1903.
NO MODEL. 5 SHEETS—SHEET 3.
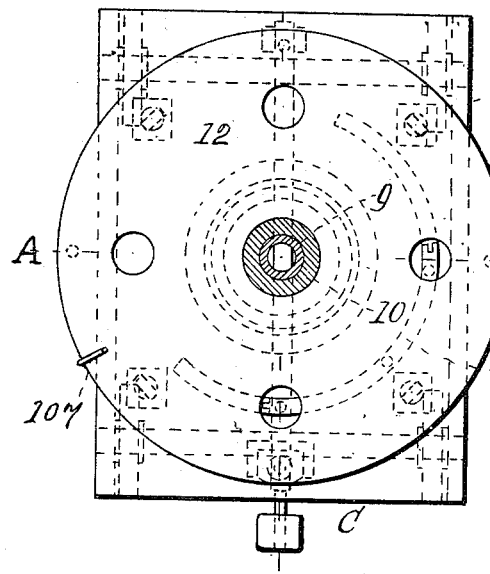
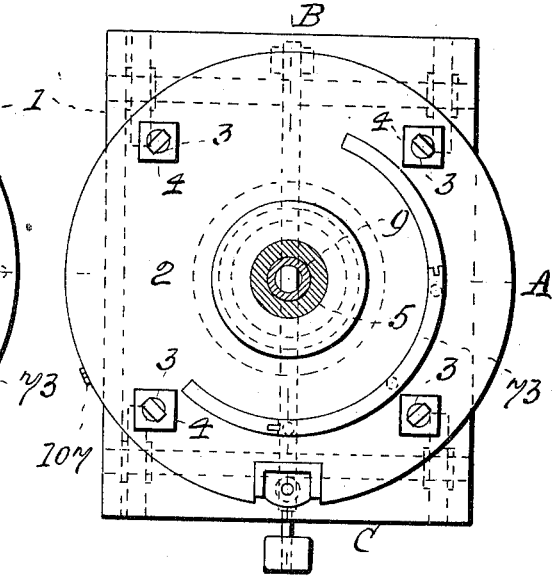
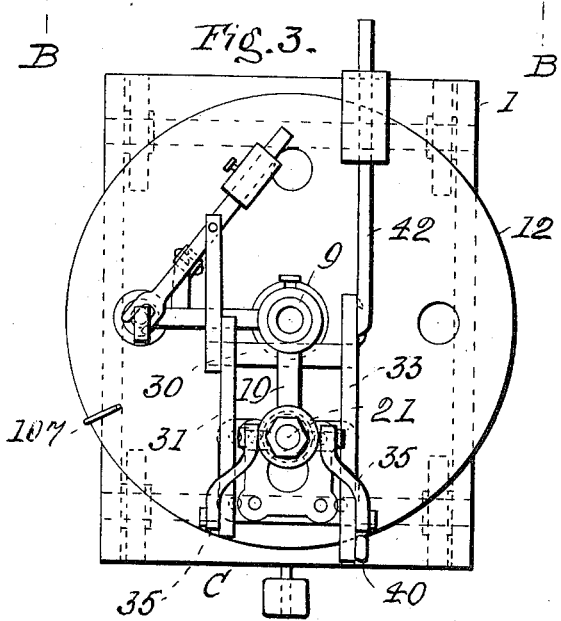
Witnesses
C. H. Walker.
Geo. J. Brennan.
Inventor
Thomas C. Duffield,
by Geo. W. T. Howard,
Attorneys No. 736,708. PATENTED AUG. 18, 1903.
T. C. DUFFIELD.
MACHINE FOR PRODUCING GLASS BOTTLES.
APPLICATION FILED MAR. 26, 1903.
NO MODEL. 5 SHEETS—SHEET 4.
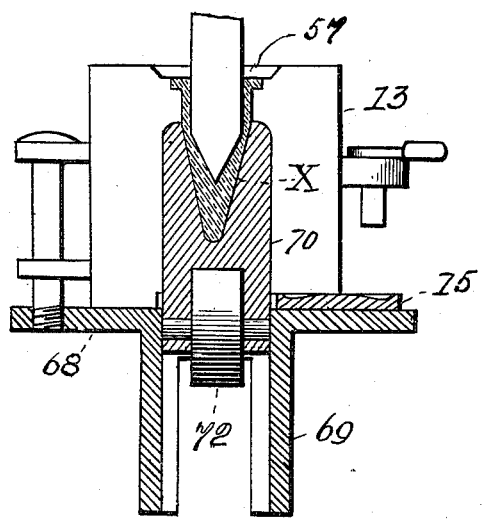
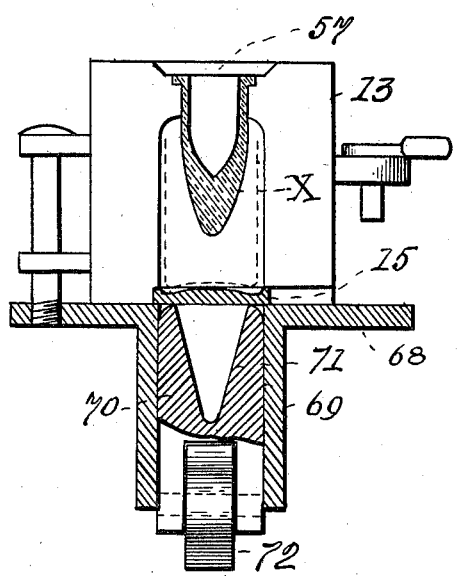
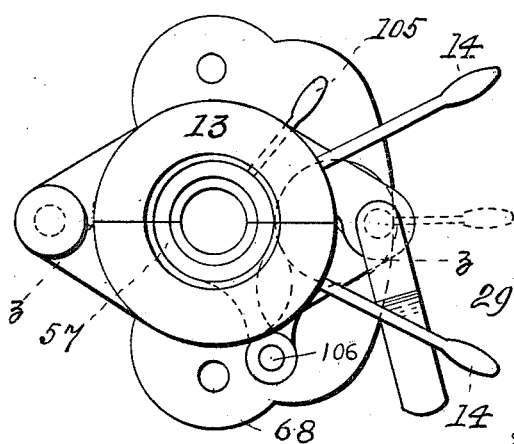
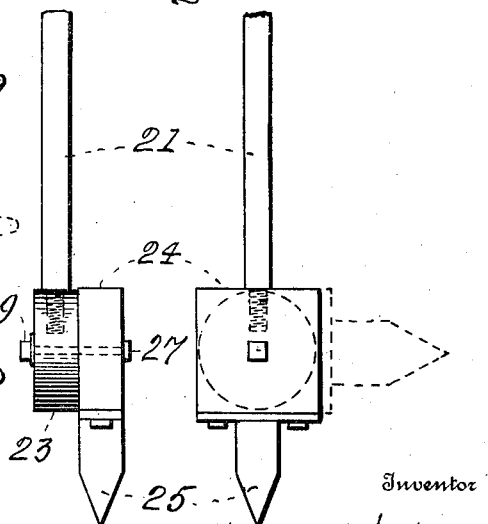

No. 736,708. PATENTED AUG. 18, 1903.
T. C. DUFFIELD.
MACHINE FOR PRODUCING GLASS BOTTLES.
APPLICATION FILED MAR. 26, 1903.
NO MODEL. 5 SHEETS—SHEET 5.
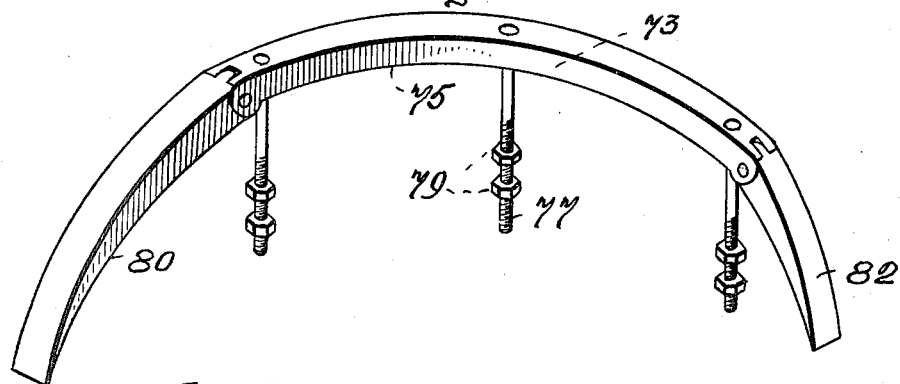
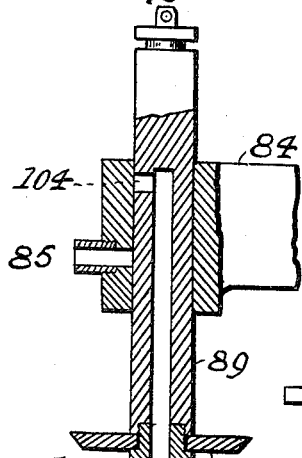
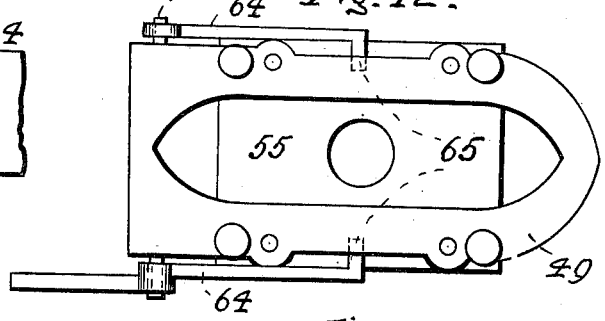
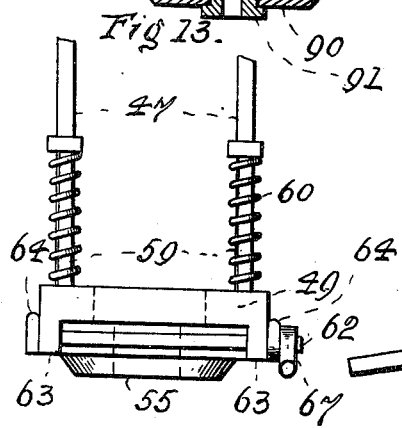
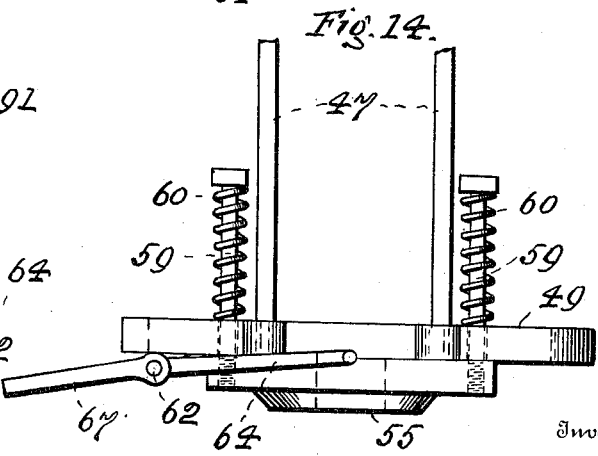
Witnesses
C. H. Walker
Geo. J. Brennan
Inventor
Thomas C. Duffield,
by G. H. W. T. Howard,
Attorneys
THE NORRIS PETERS CO., PHOTO-LITHO., WASHINGTON, D. C.

No. 736,708.                                                 Patented August 18, 1903.

UNITED STATES PATENT OFFICE.

THOMAS C. DUFFIELD, OF BRIDGETON, NEW JERSEY.

MACHINE FOR PRODUCING GLASS BOTTLES.

SPECIFICATION forming part of Letters Patent No. 736,708, dated August 18, 1903.

Application filed March 26, 1903. Serial No. 149,686. (No model.)

*To all whom it may concern:*

Be it known that I, THOMAS C. DUFFIELD, of Bridgeton, in the county of Cumberland and State of New Jersey, have invented certain Improvements in Machines for Producing Glass Bottles, of which the following is a specification.

In the description of the said invention which follows reference is made to the accompanying drawings, forming a part hereof, and in which—

Figure 1 is a front view of the improved machine. Fig. 2 is a side view. Fig. 3 is a plan. Fig. 4 is a section of Fig. 1 taken on the dotted line $x x$ in that figure. Fig. 5 is a section of Fig. 1 taken on the dotted line $y y$ in that figure. Figs. 6 to 14, inclusive, are enlarged details of the machine and hereinafter described.

Referring to the drawings, 1 is a wheeled truck, and 2 a fixed table supported from the truck by means of the threaded upright bars 3 and the adjusting-nuts 4. With this construction the height of the table or its distance from the top of the wheeled truck may be changed for a purpose hereinafter described.

5 is a central fixed column erected on the wheeled truck 1 and extending through or formed as a part of the table 2. It is provided with a flange 7, having a circular groove in its face adapted to hold a number of antifriction-balls, as shown particularly in Fig. 2.

The column 5 is made hollow, and in it is secured the fixed bar 9, which with a view to lightness in weight is formed of a pipe.

10 is a rotatable continuation of the column 5, adapted to turn about the bar 9. It is provided with a flange at its lower end similar to the one beneath and, like it, is grooved, so as to fit over the antifriction-balls, as shown in Fig. 2.

12 is a second and upper table resting on the flange of the rotatable extension 10 of the column 5, to which it is secured, and supported near its periphery by rollers journaled in the upright bars 3, as shown in Figs. 1 and 2.

13 13 are bottle-molds seated on the table 12. They are preferably four in number and placed equidistantly apart. The molds are made in two sections hinged together and provided with handles 14 to open and close them and fitted with a lock and locking-handle, as is common in bottle-molds.

Fig. 8 is a top view of a mold, and Figs. 6 and 7 are sections of Fig. 8, taken on the irregular dotted line $z z$, exhibiting also certain attachments to the mold not yet referred to, but which will be hereinafter fully described and their uses specified.

By reference to Figs. 6 and 7 it will be understood that the cavity of the mold corresponds in size and shape with that of the bottle to be formed, except that it is longer, the additional length allowing for the introduction into the mold of a top-closing plate or follower and the plate 15, which forms the bottom of the bottle. These plates and their uses will be hereinafter particularly described.

17 is a bracket having an upper and a lower arm, respectively, denoted by 19 and 20, through which extends and is adapted to have a vertical movement the threaded bar 21. To the lower end of the threaded bar 21 is secured a block 23, (see Fig. 9, which shows two views of the lower end of the said bar and its attachments,) carrying a hub 24, to which one or more pointed plungers 25 are attached. The hub is shown as provided with only one plunger, but another is indicated in dotted delineation. When two or more plungers are employed, the hub 24, which is connected to the block 23 by means of a pivotal bolt 27, may be turned by first slackening the nut 29, so as to bring any desired plunger into the position shown in Fig. 9. With this arrangement plungers of different diameters and lengths to produce bottles differing in size may be fastened to the hub and any one of them brought into service.

30 is a rotatable shaft extending horizontally through the bracket 17, having at its ends the fixed arms 31 and 33, which are connected by links 35 to the trunnions of a crosshead 37 at the upper end of the threaded bar 21. This cross-head is adjustable in height by means of nuts 39. The arm 33 differs slightly in shape and formation from the one 31 in order to admit of the attachment thereto of the hand-lever 40, whereby through the medium of the arms, the links, and the crosshead the bar 21, with its pointed plunger, may be drawn down. The upward or return movement of the bar 21 is effected by the overbalanced arm 42, integral with the arm 33.

44 is a second cross-head on the bar 21. It is vertically adjustable with respect to the bar by means of nuts 45, and from it depend the rods 47, carrying at their lower ends the plate 49. The said rods extend loosely through the cross-head 44 and have heads 50 at their upper ends to limit their downward motion independently of the cross-head, and spiral springs 52, coiled about the rods, in connection with collars 53, serve as means to communicate a yielding movement from the cross-head to the plate 49, through which the plunger 25 projects.

To the under side of the plate 49 is attached the top-closing plate or follower 55, (see particularly Figs. 13 and 14,) adapted to fit into the rabbet 57 in the mold 13.

When one plunger only is employed, the follower will be rigidly attached to the plate 49; but if several plungers are employed the construction shown in the drawings is used. In the present case the follower is flanged and made separate from the plate, to which it is united by means of the headed stems 59 and the spiral springs 60. 62 is a shaft supported loosely in lugs 63, (see Figs. 12, 13, and 14,) carrying arms 64, having pins 65, which extend between the plate and the flange of the follower. A handle 67, preferably integral with one of the arms, serves as a means to depress the pins 65, and thereby separate the follower from the plate while the hub 24 is being turned to bring a different plunger into position. To admit of this change, the opening in the plate 49 is made slot-shaped, as shown in Fig. 12, the length of the opening being a little greater than the distance from point to point of two oppositely-placed plungers.

Dependent from the fixed base-plate 68 of each mold is a slotted cylinder 69, having an inner diameter corresponding with that of the mold, as shown particularly in Figs. 6 and 7, and in each cylinder is placed a cylindrical charge-receiving plug 70, having a conical depression 71 in its upper end. The upper edge of this plug is rounded after the manner of the shoulder of the bottle to be produced and adapted when lifted into the mold to come in contact with the portion of the same which forms the neck of the bottle, as shown in Fig. 6. At its bottom the plug is provided with a roller 72, which rests on a segmental cam-rail 73 on the lower table 2. This cam-rail is shown in perspective on an enlarged scale in Fig. 10, and by reference to that figure, as well as to Figs. 1 and 2, it will be seen that it consists of an elevated bar 75 of segmental shape, sustained at a uniform height throughout its length from the table by means of the studs 77. The studs are threaded at their lower ends where they pass through the table and provided with nuts 79, whereby the height of the bar 75 may be changed to suit molds which differ in height from those shown. To the ends of the bar 75 are joined the terminal segmental bars 80 and 82, the ends of which are tapered and fall by gravity to the surface of the table. The longer terminal bar 80, which assumes a more gradual incline than the one 82, serves to elevate the plug 70 from the table 2 when the table 12 is rotated, while the shorter bar 82 allows the plug to descend rapidly and bring its roller again to contact with the table.

The position of the cam-rail with respect to the molds is well shown in Figs. 4 and 5, in which it appears that the central bar 75 begins a little above the dotted line A A and terminates a little to the left of the dotted line B B.

The front of the machine, whereat the operator stands, is indicated in Figs. 1, 2, 3, 4, and 5 by C.

From the foregoing description it will be understood that the cylindrical plug is raised to its highest position in the mold when the mold is to the right of the operator and is so held until it has passed him to the left.

Referring to Figs. 1, 2, and 3, it will be seen that the bracket 17 has a third arm 84, which is cylindrically bored (see also Fig. 11) and provided with a nozzle 85, to which is attached a tube 87, (shown in Figs. 1 and 2,) leading to some source of supply of air under pressure.

89 is a hollow cylinder open at the bottom, where it is provided with a follower-plate 90, similar to the follower 55, and with a removable projecting plug 91 of a diameter equal to that of the throat of the bottle to be blown. The upper and closed end of the cylinder 89 is circumferentially grooved to receive the forked end of a counterbalanced lever 92, fulcrumed to a standard 93, adjustable in height in a supplemental bracket 95, which projects from the arm 84, (see particularly Fig. 2,) and it is yieldingly sustained through the medium of a spring 97 by a bar 99. The lever 92 is attached by a coiled spring 100 to the end of an arm 102, tight on the shaft 30, so that when the arms 31 and 33 are drawn down by means of the hand-lever 40 the cylinder 89 is forced down and a port 104 in its wall brought into alinement or made to register with the nozzle 85. Compressed air is thus admitted to the cylinder 89, and should the cylinder at that time be situated over a mold carrying a bottle-blank or charge of melted glass and tightly connected therewith a bottle will be blown.

By reference particularly to Figs. 6, 7, and 8 it will be seen that at the base of the mold a portion of the wall thereof is slotted for the reception of the plate 15, before briefly alluded to as forming the bottom of the bottle. This plate is circular and a little larger in diameter than the interior of the body of the mold wherein the bottle-body is blown, and it has a tail-piece which is pivoted at 106 to the base-flange of the mold, as shown in Fig. 8. The said plate is provided with a handle 105, whereby it may be moved into or from the mold; but the former operation is automatically performed by the handle striking a trigger 107 after the plug 70 has fallen out of its way and before the mold reaches the blowing mechanism, as hereinafter described.

The rotary upper table 12 is fitted with the usual stop mechanism to lock the table at each quarter of a rotation and with an unlocking treadle; but these appliances are commonly employed and need no description herein.

Supposing that the operator be standing in front of the machine, the closed mold to his right is provided in the usual manner with a charge of molten glass. At the time the mold is charged the plug 70 is in its highest position, as shown in Fig. 6, for the reason that its roller 72 is resting on the central bar 75 of the cam-rail 73. The table 12, which at this time is locked, is now released by the operator, who turns it until the charged mold comes before him and directly under the elevated plunger 25, when further movement of the table is suspended. The operator then draws down the lever 40, which causes the bar 21 to descend and the point of the plunger to be thrust into the charge of glass, the mold at the same time being closed by the follower 55, which seats itself in the rabbet 57. By continuing the downward movement of the hand-lever after the follower is seated in the mold the plunger passes farther into the glass and finally reaches the position indicated in Fig. 6, wherein the glass is denoted by X. The operator then releases the hand-lever 40, which allows the plunger to withdraw from the mold and ascend to its original height. He then turns the table to the left, so as to bring the next charged mold into position, when the operation described is repeated. As the first mold passes to the left of the operator the plug 70 descends by gravity, its roller following the downwardly-inclined surface of the shorter terminal bar 82 of the cam-rail until it reaches the position indicated in Fig. 7. The molten glass after the removal therefrom of the supporting-plug 70 assumes its natural shape, which is approximate to that shown in Fig. 7. It will be understood that when the charge of molten glass is inserted in the mold the pivoted plate 15, which forms the bottom of the bottle, is turned outward, as shown by its dotted delineation in Fig. 8, but is thrown into the mold (see Fig. 7) before the second mold comes to the front of the machine by the handle 105 striking the trigger 107. When the second mold reaches the front of the machine, the first one will be directly under the air-cylinder 89, and as the plunger is depressed in the second operation the said cylinder is lowered, by means of the mechanism described, until its follower-plate 90 enters the rabbet 57, and the mold is again closed. At the same time compressed air, which has filled the cylinder 89 by the registration of the port 104 with the nozzle 85, under pressure enters the hollow glass charge and forces it out against the inner surface of the mold, thereby producing a bottle, which is taken from the mold before the latter reaches the place at which it is to be again charged with molten glass.

From the foregoing description of the construction and operation of the machine it will be understood that at each actuation of the hand-lever 40 a bottle is completed and that the machine is susceptible of such adjustment as will admit of the manufacture of bottles differing considerably in size and shape. The table 2 being supported entirely by the nuts 4 on the upright bars 3, it may be elevated or lowered without disturbing the cam-rail 73, and the cam-rail may be changed in height independently of the table by adjusting the nuts 79 on the studs 77.

As the terminal bars 80 and 82 of the cam-rail are supported only where pivoted to the central bar 75, their ends invariably or in all circumstances rest on the table and are unaffected by any change in the height of the central bar 75, which is the operative one and governs the length of stroke or lift of the plug 70, except being altered slightly in angle of inclination.

I claim as my invention—

1. In a machine for producing glass bottles, a rotary table, a mold having a hollow cylinder dependent therefrom seated on the table, a plug situated within the cylinder adapted to receive and sustain a charge of molten glass, a fixed table adjustable in height, situated beneath the rotary table, and a cam-rail seated on the fixed table adapted in the rotation of the upper table to project the said plug into the mold and then admit of its fall by gravity therefrom, combined with means to effect a depression in the charge of molten glass in the mold, and appliances to close the mold and admit air under pressure into the depression formed in the glass after the withdrawal of the charge-sustaining plug from the mold, substantially as specified.

2. In a machine for producing glass bottles, the combination with a rotary table carrying a series of bottle-forming molds, vertically-moving charge-sustaining plugs, a non-rotary vertically-adjustable table underneath the mold-carrying table, and a cam seated on the lower table and adjustable in height thereon, the said cam being adapted in the rotation of the upper table, to elevate the charge-receiving plugs and admit of their depression, substantially as specified.

3. In a machine for producing glass bottles, a cam mechanism for the purpose described, which comprises a table or support, a segmental rail in three sections, viz: a central elevated bar adjustable in height with respect to the table or support, and terminal bars hinged to the central bar, with their free ends in contact with the said table or support, substantially as specified.

4. In a machine for producing glass bottles, a cam mechanism for the purpose described which comprises a table or support, a segmental rail in sections, viz: a central elevated bar, and terminal bars hinged to the central bar with their free ends in contact with the said table or support, substantially as specified.

THOS. C. DUFFIELD.

Witnesses:
ANTHONY J. SHAW,
BENJAMIN F. PARKER.